US008346013B2

(12) United States Patent
Yamada

(10) Patent No.: US 8,346,013 B2
(45) Date of Patent: Jan. 1, 2013

(54) IMAGE PROCESSING APPARATUS, IMAGE PROCESSING METHOD, AND PROGRAM

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/551,612

(22) Filed: Sep. 1, 2009

(65) Prior Publication Data
US 2010/0061628 A1  Mar. 11, 2010

(30) Foreign Application Priority Data

Sep. 8, 2008 (JP) ................ P2008-229836

(51) Int. Cl.
G06K 9/36 (2006.01)
(52) U.S. Cl. ........ 382/282; 382/180; 382/284; 382/298; 345/629
(58) Field of Classification Search .................. None
See application file for complete search history.

(56) References Cited

U.S. PATENT DOCUMENTS

| 7,747,107 | B2* | 6/2010 | Avidan et al. ............ 382/298 |
| 2006/0285747 | A1* | 12/2006 | Blake et al. ............ 382/180 |
| 2007/0165966 | A1* | 7/2007 | Weiss et al. ............ 382/284 |
| 2008/0198175 | A1* | 8/2008 | Sun et al. ............ 345/629 |

FOREIGN PATENT DOCUMENTS

| JP | 10-023452 | 1/1998 |
| JP | 2006-053919 | 2/2006 |
| JP | 2006-053921 | 2/2006 |
| WO | WO 2006/138730 | 12/2006 |

OTHER PUBLICATIONS

A. Levin et al., "A Closed Form Solution to Natural Image Matting," 2006 Conference on Computer Vision and Pattern Recognition (CVPR 2006), pp. 61-68 (Jun. 2006).
J. Wang et al., "Soft Scissors: An Interactive Tool for Realtime High Quality Matting," ACM Transactions on Graphics, 26(3), pp. 9:1-9:6 (Jul. 2007).
Y.-Y. Chuang et al., "A Bayesian Approach to Digital Matting," Proceedings of IEEE Computer Vision and Pattern Recognition (CVPR 2001).
Japanese Office Action in 2008-229836 dated Sep. 6, 2012. 4 pages.

* cited by examiner

Primary Examiner — Tsung-Yin Tsai
(74) Attorney, Agent, or Firm — Finnegan, Henderson, Farabow, Garrett & Dunner LLP

(57) ABSTRACT

An image processing apparatus includes a defined binary image generating unit configured to generate a defined binary image associated with a level image, which is associated with an input image, the level image having pixel values of pixels represented using a first value, by regarding a pixel as a defined or undefined region pixel and setting the pixel to have a predetermined second or third value; and an estimated foreground color image generation unit configured to generate an estimated foreground color image associated with the input image, by setting the pixel values of the pixels regarded as the undefined region pixels in the defined binary image to pixel values of pixels in the input image corresponding to pixels for which distances each obtained from an integrated value of the amounts of change in continuity information are shortest from among the pixels that are regarded as the defined region pixels.

11 Claims, 12 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, and more particularly, to an image processing apparatus, an image processing method, and a program that are capable of extracting a foreground object image from an input image and a binary mask image (binary image) without causing color blur.

2. Description of the Related Art

Alpha matting is a general technique for cutting out, as a foreground object image, a certain region of a digital image such as a picture.

Cutting out a foreground object image by multiplying an alpha mask image generated by the alpha matting technique and an input image together and combining the foreground object image with a new background image is considered.

Here, an alpha mask image is represented using values indicating the levels of transparency of individual pixels in a foreground object image (hereinafter, also referred to as α values). That is, an alpha mask image is a transparency level image including pixels representing the levels of transparency in a foreground object image. In an alpha mask image, each pixel value is represented using the transparency α of the color arrangement in a foreground object image. For example, 100-percent transparency is represented by α=1, 0-percent transparency is represented by α=0, and 50-percent transparency (halftone) is represented by α=0.5. Thus, an image obtained by multiplying pixel values in a foreground object image by the transparencies α of corresponding pixels in an alpha mask image is extracted as a foreground object image.

Here, pixels around the edge of the foreground object image may retain the color of a background image of the input image.

This occurs because an input image originally includes an edge portion of a foreground object image in which the color of the foreground object image is mixed with the color of a background image and the color-mixed edge portion becomes apparent as color blur when the foreground object image is combined with a new background image. Thus, in order to achieve more natural combining of a cut-out foreground object image, it is necessary not only to obtain an alpha mask image but also to obtain the foreground object image by calculating the true color of the foreground object image, so that the foreground object image and the alpha mask image can be multiplied together and used for the combining.

For example, the methods described below are foreground color estimation methods used in the alpha matting technique described above.

A first method is a method for minimizing, in accordance with an alpha mask image obtained using alpha-matting and an input image, differences between pixel values of the input image and pixel values obtained from an estimated foreground image, an estimated background image, and the alpha mask image and for minimizing a first-order differential difference (see A. Levin, D. Lischinski, and Y. Weiss, "A Closed Form Solution to Natural Image Matting", 2006 Conference on Computer Vision and Pattern Recognition (CVPR 2006), June 2006, pp. 61-68). In this method, on the basis of the prediction that an alpha value, a foreground color, or a background color greatly changes at a pixel position at which the pixel value greatly changes, a smooth foreground image can be obtained.

A second method is a method for producing simultaneous linear equations under the constraint of a difference in an α value from an alpha mask image obtained using alpha matting and an input image, complementing pixel values of the input image, and estimating the foreground color (see Jue Wang, Maneesh Agrawala, and Michael F. Cohen, "Soft Scissors: An Interactive Tool for Realtime High Quality Matting", ACM Transactions on Graphics, 26(3), July 2007, pp. 9:1-9:6). The second method is effective because only an alpha difference value is put under constraint.

A third method is a method for, when an alpha mask image is calculated using alpha matting, employing a tentative foreground color obtained in a transitive manner as an estimated foreground color (see Yung-Yu Chuang, Brian Curless, David H. Salesin, and Richard Szeliski, "A Bayesian Approach to Digital Matting", In Proceedings of IEEE Computer Vision and Pattern Recognition (CVPR 2001), Vol. II, 264-271, December 2001). In the third method, an alpha value is calculated by sampling a plurality of candidates of foreground color and background color from pixels surrounding a pixel at a position to be calculated.

A fourth method is a method for manually removing color blur by using image processing software on an alpha mask image obtained using alpha-matting and an input image. The fourth method is provided as a "defringe function" (see http://help.adobe.com/ja_JP/Photoshop/10.0/help.html?content=WSfd1234e1c4b69f30ea53e41001031ab64-76de.html).

SUMMARY OF THE INVENTION

However, in the first method, since the size of the simultaneous linear equations temporarily produced in the process of calculation is very large, there is a restriction in that a large amount of memory is necessary.

In the second method, since only an alpha difference value is put under constraint, effectiveness can be achieved. However, in a case where the distribution of foreground color is not simple but is mixed in a complicated manner, a correct result might not be obtained.

In the third method, since a spatial constraint is not imposed on estimated foreground colors, if the foreground colors are directly employed, only discontinuous foreground images may be obtained. In addition, in a case where good samples are not obtained, inappropriate colors may be employed.

In the fourth method, it is necessary to manually set the background color to be eliminated, a spatial position, an application range, and the like. Thus, a complicated operation is necessary.

It is desirable to reduce the memory amount necessary for estimation of a foreground color and to extract a foreground object image without causing color blur even if the foreground color is smoothly continuous in terms of space and a complicated color distribution exists in a foreground edge portion.

According to an embodiment of the present invention, there is provided an image processing apparatus including defined binary image generating means for generating a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and estimated foreground color image generating means for generating an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value.

The estimated foreground color image generating means may include differential processing means for performing differential processing of the first value for the individual pixels in the level image; and distance calculating means for calculating, as the distances each obtained from the integrated value of the amounts of change in the continuity information, integrated values of differential processing results on the individual pixels in the level image obtained by the differential processing means, the differential processing results regarding pixels on paths from the individual pixels in the level image to the pixels that are regarded as the defined region pixels and that are set to have the predetermined second value.

The estimated foreground color image generating means may generate the estimated foreground color image associated with the input image, by applying predetermined weights to pixel values of a plurality pixels in the input image that are located near the pixels in the input image corresponding to the pixels for which the distances each obtained from the integrated value of the amounts of change in the continuity information are shortest from among the pixels that are regarded as the defined region pixels and that are set to have the predetermined second value and located near the boundary between the undefined region and the defined region, obtaining averages of the pixel values that have been subjected to weighting, and setting the pixel values of the individual pixels that are regarded as the undefined region pixels and that are set to have the predetermined third value in the defined binary image to the averages.

The predetermined weights may be set in accordance with distances from the pixels for which the distances each obtained from the integrated value of the amounts of change in the continuity information are shortest from among the pixels that are regarded as the defined region pixels and that are set to have the predetermined second value.

The distances each obtained from the integrated value of the amounts of change in the continuity information may be represented by integrated values of the absolute values of the amounts of change in foreground likelihood values statistically obtained from positions of a set of pixels in the foreground image region and positions of a set of pixels in a background image region of individual pixels in the level image on paths from the individual pixels in the level image to the pixels that are regarded as the defined region pixels and that are set to have the predetermined second value.

The distances each obtained from the integrated value of the amounts of change in the continuity information may be represented by integrated values of the absolute values of the amounts of change in edge tangent flow vectors of individual pixels in the level image on paths from the individual pixels in the level image to the pixels that are regarded as the defined region pixels and that are set to have the predetermined second value.

The distances each obtained from the integrated value of the amounts of change in the continuity information may be represented by integrated values of the absolute values of the amounts of change in edge tangent flow vectors of individual pixels in the input image on paths from the individual pixels in the level image to the pixels that are regarded as the defined region pixels and that are set to have the predetermined second value.

The image processing apparatus may further include weighted-image generating means for applying a weight to each of the individual pixels that are regarded as the undefined region pixels and that are set to have the predetermined third value in the defined binary image and generating a weighted image associated with the defined binary image; matrix generating means for generating a Laplacian matrix in accordance with path information in which paths from the individual pixels in the level image to the pixels that are regarded as the defined region pixels and that are set to have the predetermined second value are expressed by a graph structure; function generating means for generating an energy function employing a foreground color image as a parameter in accordance with the weighted image, the Laplacian matrix, and the estimated foreground color image; and foreground color image calculating means for calculating a foreground color image for which a minimum energy function is obtained.

The weight set for the weighted image may control the force of constraint for causing the estimated foreground color image in the energy function to approach the foreground color image.

The weight set for the weighted image may be the first value set in the individual pixels in the level image.

According to another embodiment of the present invention, there is provided an image processing method for an image processing apparatus including defined binary image generating means for generating a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and estimated foreground color image generating means for generating an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value, the method including the steps of generating, with the defined binary image generating means, a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and generating, with the estimated foreground color image generating means, an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value.

According to another embodiment of the present invention, there is provided a program for causing a computer controlling an image processing apparatus including defined binary image generating means for generating a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and estimated foreground color image generating means for generating an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value, to perform processing including the steps of generating, with the defined binary image generating means, a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and generating, with the estimated foreground color image generating means, an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value.

An image processing apparatus according to an embodiment of the present invention may be an independent apparatus or a block configured to perform image processing.

According to an embodiment of the present invention, robust estimation of a foreground color can be achieved while the amount of necessary memory is reduced. In addition, color blur caused by a background color is reduced, and the image quality of an image process result, such as combining with a new background, can be achieved.

DESCRIPTION OF THE PREFERRED EMBODIMENTS

Example of Configuration of Image Processing Apparatus

Figure 1:
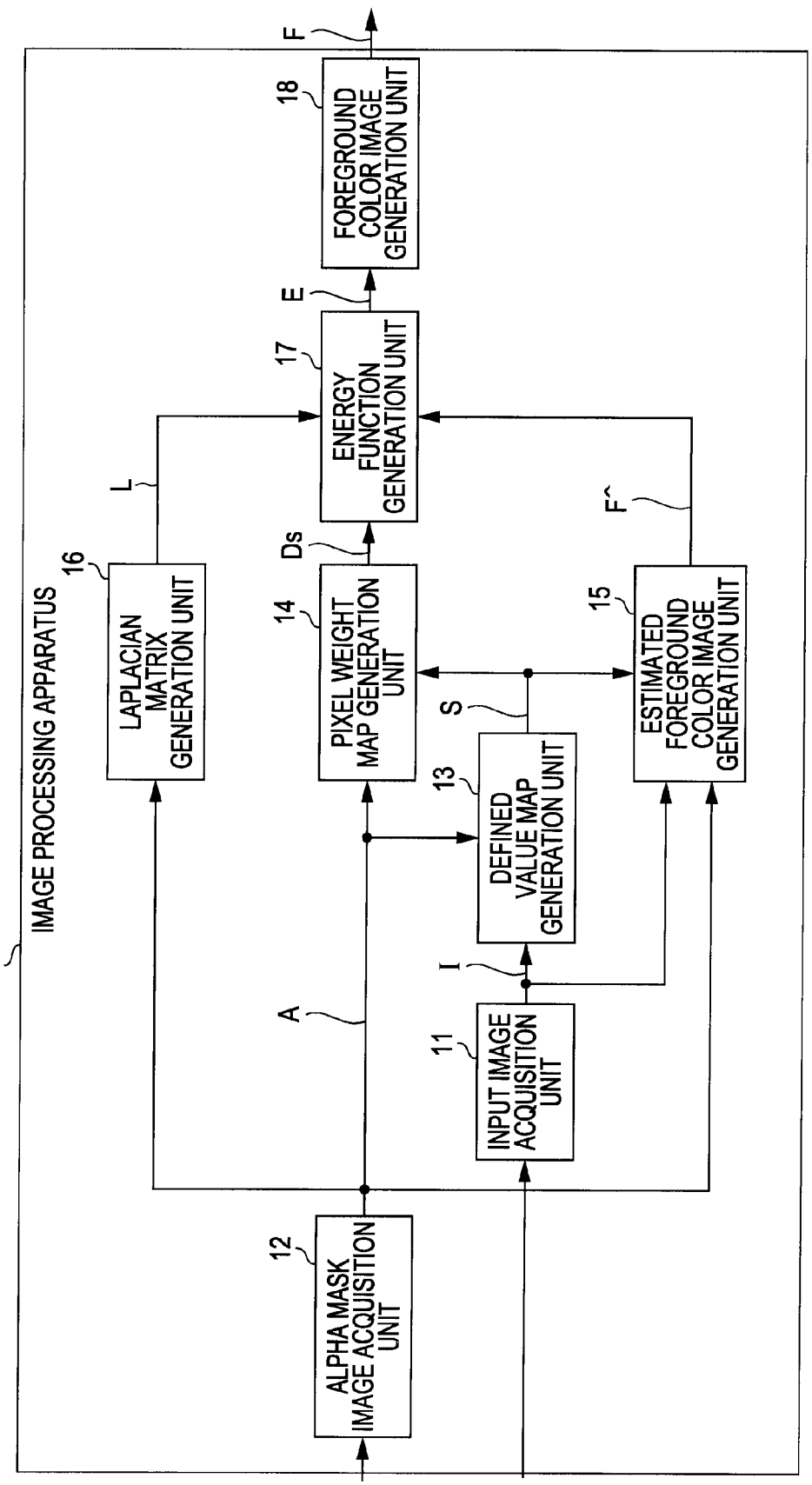
FIG. 1 is a block diagram showing an example of the configuration of an image processing apparatus according to an embodiment of the present invention.

FIG. 1 shows an example of the configuration of an image processing apparatus according to an embodiment of the present invention.

An image processing apparatus 1 shown in FIG. 1 is capable of extracting a foreground object image F from an input image I without causing color blur in accordance with an alpha mask image A (a level image representing the level of transparency in a foreground object image).

The image processing apparatus 1 includes an input image acquisition unit 11, an alpha mask image acquisition unit 12, a defined value map generation unit 13, a pixel weight map generation unit 14, an estimated foreground color image generation unit 15, a Laplacian matrix generation unit 16, an energy function generation unit 17, and a foreground color image generation unit 18.

The input image acquisition unit 11 acquires an input image I, which includes a foreground object image to be extracted, and supplies the acquired input image I to the defined value map generation unit 13 and the estimated foreground color image generation unit 15.

The alpha mask image acquisition unit 12 acquires an alpha mask image A (a level image including pixels representing the levels of transparency in a foreground object image) including values representing the transparency α in units of pixels in the received foreground object image (hereinafter, also referred to as α values). Then, the alpha mask image acquisition unit 12 supplies the acquired alpha mask image A to the defined value map generation unit 13, the pixel weight map generation unit 14, the estimated foreground color image generation unit 15, and the Laplacian matrix generation unit 16. The detailed configuration of the estimated foreground color image generation unit 15 will be described later with reference to FIG. 2.

The defined value map generation unit 13 generates a defined value map image S from the alpha mask image A and the input image I. The defined value map image S includes pixels that have a first pixel value and that are defined as pixels located in a defined region and belonging to a foreground object image or a background image; and pixels that have a second pixel value and that are located in an undefined region and do not belong to a foreground object image or a background image. The defined value map generation unit 13 supplies the generated defined value map image S to the pixel weight map generation unit 14 and the estimated foreground color image generation unit 15. Here, pixels not belonging to a foreground object image or a background image are considered to be pixels in which colors in the foreground object image and the background image bleed into each other. In the defined value map image S, for example, "1" is set to the first pixel value, and, for example, "0" is set to the second pixel value. The defined value map generation unit 13 also provides each of the defined pixels in the defined value map image S with information indicating whether the defined pixel belongs to the foreground object image or the background image.

The pixel weight map generation unit 14 generates a pixel weight map image Ds in accordance with the defined value map image S and the alpha mask image A, and supplies the generated pixel weight map image Ds to the energy function generation unit 17. More specifically, the pixel weight map generation unit 14 generates a pixel weight map image Ds by setting a pixel value in the alpha mask image A corresponding to each pixel located in the undefined region in the defined value map image S, that is, the transparency α, as a weight to be applied to the pixel.

The estimated foreground color image generation unit 15 generates an estimated foreground color image F^ from the input image I, the alpha mask image A, and the defined value map image S, and supplies the generated estimated foreground color image F^ to the energy function generation unit 17. More specifically, the estimated foreground color image generation unit 15 calculates, by using Sobel filtering, differential values for pixels in the alpha mask image A corresponding to individual pixels located in the undefined region in the defined value map image S. When the integrated value of differential values for undefined pixels existing on the path from each undefined pixel to a pixel on the boundary of the defined region is regarded as a distance, the pixel value of a defined pixel at the shortest distance is set as the pixel value of the undefined pixel. Accordingly, an image including pixel values at pixel positions in the foreground object image at the shortest distance, the distance being represented by the integrated value of differential values for undefined pixels, is obtained as an estimated foreground color image F^.

The Laplacian matrix generation unit 16 assumes, from the alpha mask image A, a linear model of pixel values in a local region of the foreground object image and the background image in accordance with, for example, the average and spread of pixels surrounding a target pixel, and calculates the degree of contribution of the surrounding pixels to generate a Laplacian matrix L. The Laplacian matrix L is a positive definite symmetric sparse matrix, in which the number of rows and columns corresponds to the total number of pixels of the alpha mask image A.

For example, in the case of the technique described in the document by A. Levin, D. Lischinski, and Y. Weiss, "A Closed Form Solution to Natural Image Matting", 2006 Conference on Computer Vision and Pattern Recognition (CVPR 2006), June 2006, pp. 61-68, each element of the Laplacian matrix L includes weighting with respect to neighboring pixels, and a linear model is assumed in which, the color of the foreground object image and the color of the background image are substantially constant within a small area including 3×3 pixels and only α values are changed. Each element of the Laplacian matrix L is calculated from the average and covariance of a small area including 3×3 pixels surrounding a center pixel. In accordance with such elements, to what extent the α value of a neighboring pixel and the α value of a center pixel should be similar is defined. The details of a Laplacian matrix L will be available, for example, from the document by A. Levin, D. Lischinski, and Y. Weiss, "A Closed Form Solution to Natural Image Matting", 2006 Conference on Computer Vision and Pattern Recognition (CVPR 2006), June 2006, pp. 61-68.

The energy function generation unit 17 generates an energy function E, in which vectors x forming RGB color images Fc of the foreground color image F are used as parameters, in accordance with the pixel weight map image Ds, the Laplacian matrix L, and the estimated foreground color image F^, and supplies the generated energy function E to the foreground color image generation unit 18.

The foreground color image generation unit 18 calculates vectors x for RGB color images Fc for which the smallest energy function E can be obtained, and calculates the foreground color image F from the vectors x of the individual colors. The foreground color image generation unit 18 outputs the foreground color image F as a foreground object image defined by the alpha mask image A from the input image I. The foreground color image F is the foreground object image extracted from the input image I in accordance with the finally extracted alpha mask image A.

Example of Configuration of Estimated Foreground Color Image Generation Unit

Figure 2:
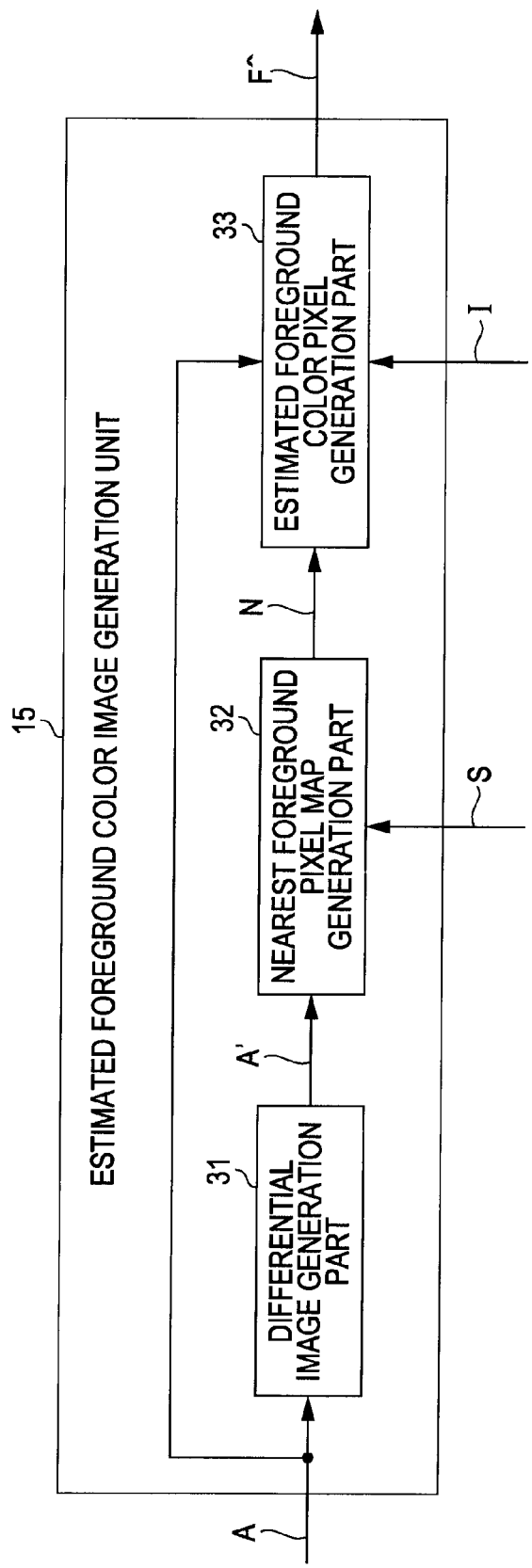
FIG. 2 is a block diagram showing an example of the configuration of an estimated foreground color image generation unit.

An example of the detailed configuration of the estimated foreground color image generation unit 15 will now be explained with reference to FIG. 2.

The estimated foreground color image generation unit 15 includes a differential image generation part 31, a nearest foreground pixel map generation part 32, and an estimated foreground color pixel generation part 33.

The differential image generation part 31 differentiates the α values of individual pixels in the alpha mask image A by using, for example, Sobel filtering, and supplies a differential image A' formed by the differential results to the nearest foreground pixel map generation part 32. Since it is only necessary for the differential image generation part 31 to differentiate a value, other types of filtering may be used instead of Sobel filtering.

The nearest foreground pixel map generation part 32 searches for, for each pixel in the undefined region in the defined value map image S, a pixel in the defined region at the shortest distance. In this processing, the nearest foreground pixel map generation part 32 calculates the integrated value of differential values for undefined pixels existing on the path from each pixel in the undefined region to a pixel in the defined region as the distance of the path, and searches for a pixel in the defined region at the shortest distance. Then, the nearest foreground pixel map generation part 32 generates a nearest foreground pixel map image N in which information on the pixel positions of the found pixels in the defined region is associated with corresponding pixels, and supplies the nearest foreground pixel map image N to the estimated foreground color pixel generation part 33.

The estimated foreground color pixel generation part 33 generates an estimated foreground color image F^ by setting the pixel values in the input image I corresponding to the pixel positions set in the nearest foreground pixel map image N, and outputs the estimated foreground color image F^.

Foreground Color Image Generation Process

A foreground color image generation process will now be explained with reference to a flowchart of FIG. 3.

Figure 4:
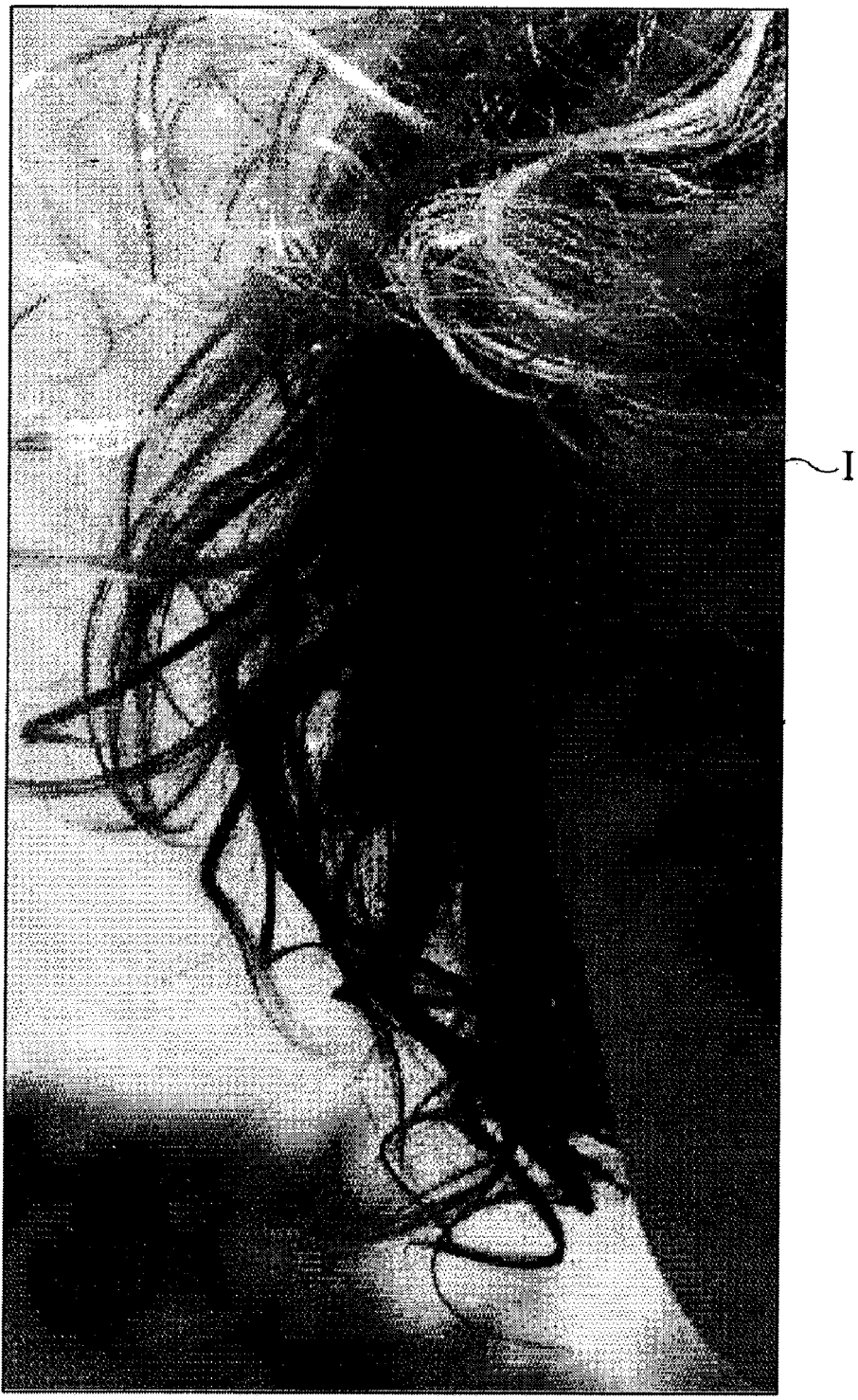
FIG. 4 is an illustration showing an example of an input image.
Figure 5:
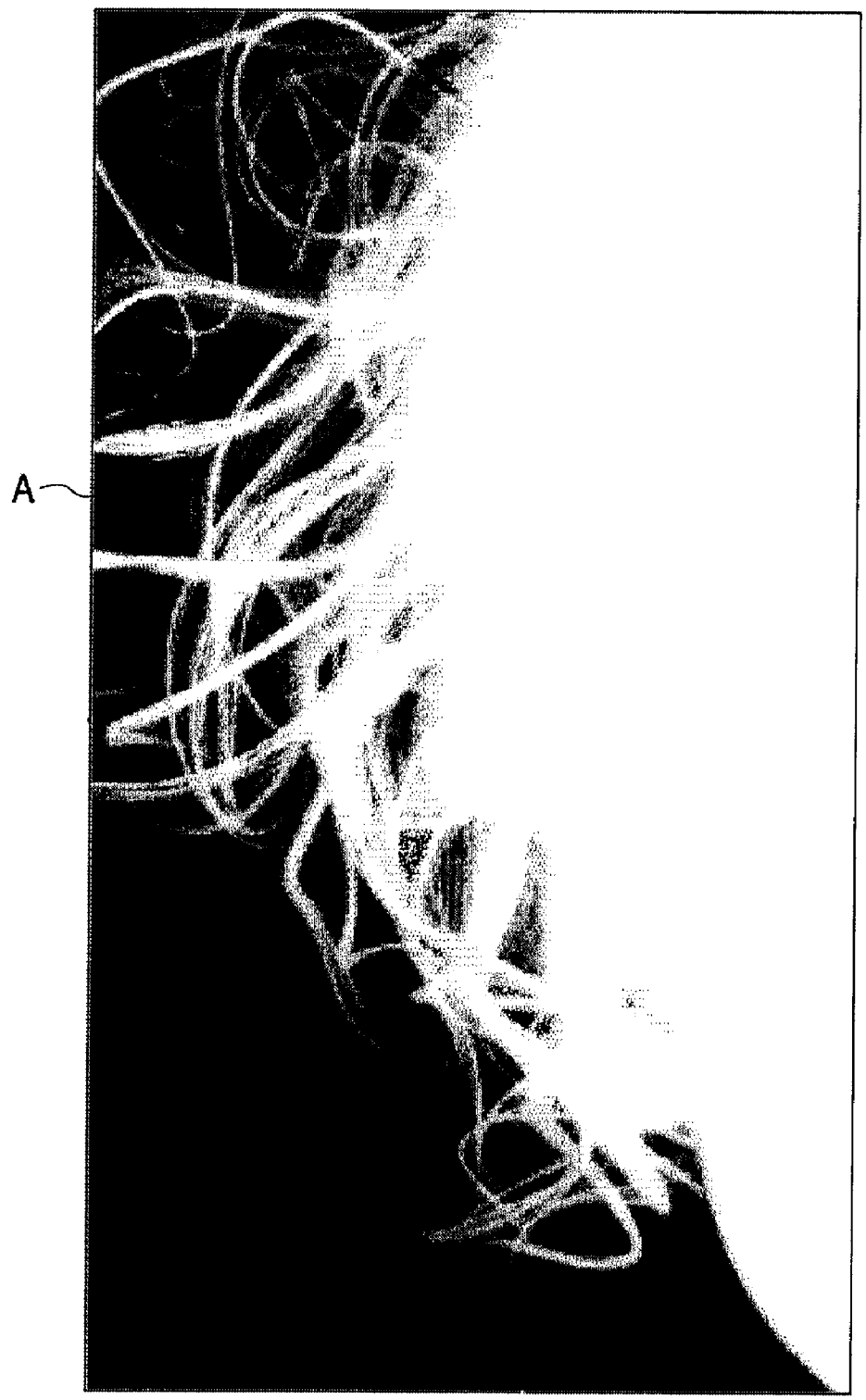
FIG. 5 is an illustration showing an example of an alpha mask image.

In step S1, the input image acquisition unit 11 determines whether or not an input image I has been supplied and the alpha mask image acquisition unit 12 determines whether or not an alpha mask image A has been supplied. This processing is repeated until an input image I and an alpha mask image A have been supplied. In a case where it is determined in step S1 that an input image I and an alpha mask image A have been received, for example, as shown in FIGS. 4 and 5, the process proceeds to step S2. FIG. 4 shows an example of an input image I obtained by capturing part of a facial image of a person, and FIG. 5 shows an example of an alpha mask image A associated with the input image I shown in FIG. 4. In the alpha mask image A shown in FIG. 5, white color is set in the case where the transparency α is 1 and black color is set in the case where the transparency α is "0". In the following description, a facial image region including a hair image in the input image I is regarded as a foreground object image and the other regions are regarded as a background image.

In step S2, the input image acquisition unit 11 supplies the received input image I to the defined value map generation unit 13 and the estimated foreground color image generation unit 15. The alpha mask image acquisition unit 12 supplies the received alpha mask image A to the defined value map generation unit 13, the pixel weight map generation unit 14, the estimated foreground color image generation unit 15, and the Laplacian matrix generation unit 16.

The defined value map generation unit 13 generates, from the alpha mask image A, a defined value map image S including pixels that have a predetermined first pixel value and that are defined as pixels belonging to a foreground object image or a background image and pixels that have a predetermined second pixel value and that do not belong to the foreground object image or the background image.

Figure 6:
FIG. 6 is an illustration showing an example of a defined value map image.

More specifically, the defined value map generation unit 13 generates a defined value map image S, in which pixels whose transparency α is set to "1" or "0" are regarded as defined pixels for which the color of the foreground object image is defined and the pixel value of the defined pixels is set to, for example, "1", and the pixel value of undefined pixels is set to "0". In addition, the defined value map generation unit 13 sets a pixel that is set as a defined pixel having a transparency α of more than 0.5 as a foreground defined pixel, and sets a pixel that is set as a defined pixel having a transparency α of less than 0.5 as a background defined pixel. The defined value map generation unit 13 generates a defined value map image S, for example, as shown in FIG. 6, for the alpha mask image A shown in FIG. 5. In FIG. 6, a white region Z1 represents a defined region including defined pixels forming a foreground object image, a black region Z2 represents an undefined region including undefined pixels, and a white region Z3, which faces the region Z1 across the region Z2, represents a defined region forming a background image.

In addition, defined pixels do not necessarily have a transparency α of "1" or "0". A determination as to whether or not a pixel is a defined pixel may be made in accordance with a desired threshold. For example, a pixel having a transparency α of more than 0.98 or a transparency α of less than 0.02 may be regarded as a defined pixel. In addition, in order to improve the accuracy in the subsequent processing, an undefined region including undefined pixels may be wider than a defined region by, for example, some pixels. By performing such processing, for example, even in a case where the color interpolated between a defined pixel and an undefined pixel is calculated since an input image I is an up-sampled image, the color of a foreground object image can be calculated at high accuracy without causing color blur.

In step S3, the pixel weight map generation unit 14 generates a pixel weight map image Ds in accordance with the defined value map image S and the alpha mask image A, and supplies the generated pixel weight map image Ds to the energy function generation unit 17. More specifically, the pixel weight map generation unit 14 generates a pixel weight map image Ds, in which a pixel value in the alpha mask image A corresponding to a pixel in the undefined region in the defined value map image S, that is, the transparency α, is set as a weight to be applied to the pixel. By adjusting values corresponding to individual pixels in the pixel weight map image Ds, the characteristics of the energy function E, which will be described later, change. For example, the energy function E is set in such a manner that as a value corresponding to each pixel in the pixel weight map image Ds increases, a foreground color image close to an estimated foreground color image is more likely to be obtained. Meanwhile, as a value corresponding to each pixel in the pixel weight map image Ds decreases, a value closer to a value interpolated from the pixel value of a neighboring pixel in the foreground object image can be obtained and thus the pixel values of the foreground object image having a smooth continuity can be obtained.

In this embodiment, the transparency α ($0 \leq α \leq 1$) of each pixel is used as a weight to be applied to the pixel in the pixel weight map image Ds. However, any other value may be used as a weight.

In step S4, the estimated foreground color image generation unit 15 performs an estimated foreground color image generation process. In the estimated foreground color image generation process, the estimated foreground color image generation unit 15 generates an estimated foreground color image F^ from the input image I, the alpha mask image A, and the defined value map image S, and supplies the generated estimated foreground color image F^ to the energy function generation unit 17.

Estimated Foreground Color Image Generation Process

Figure 7:
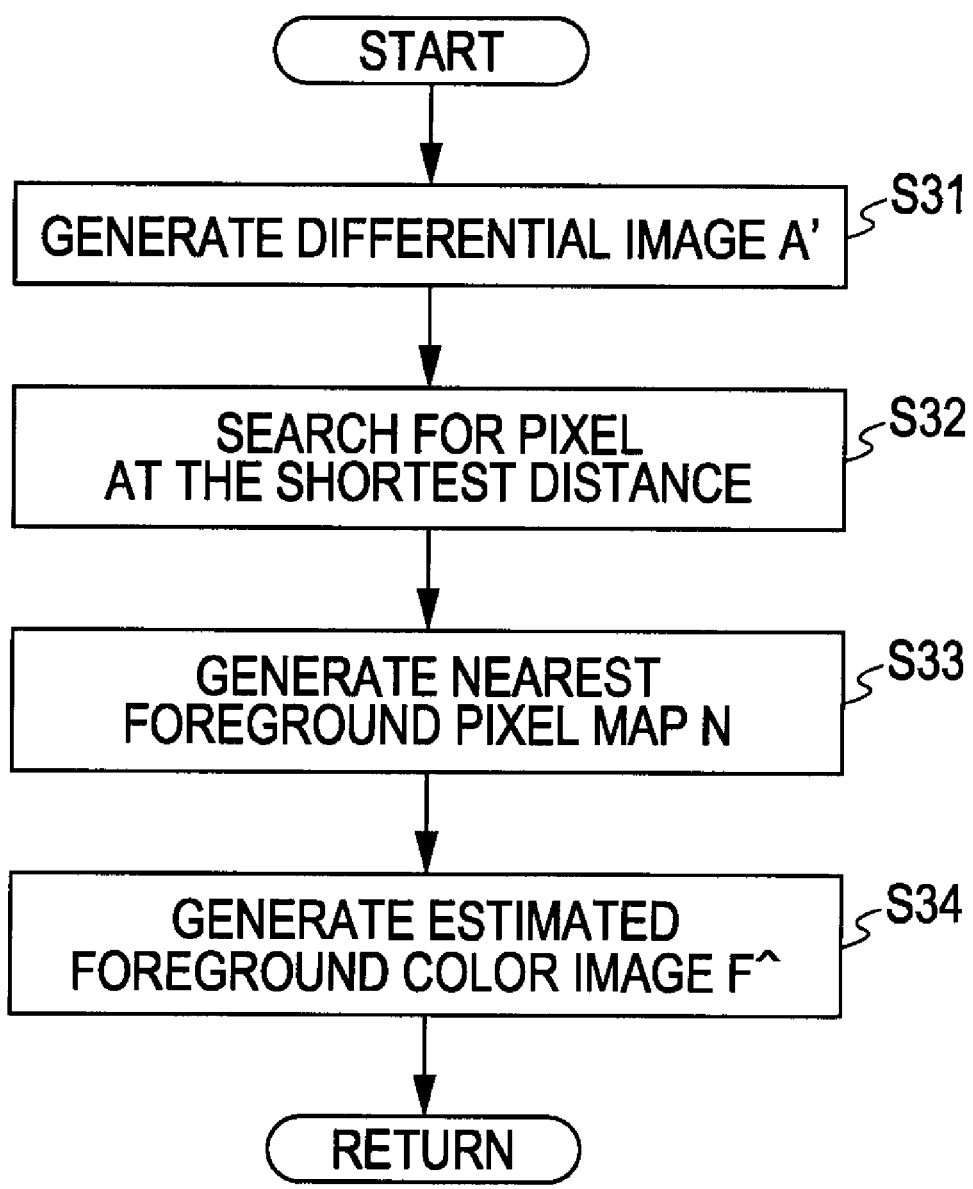
FIG. 7 is a flowchart for explaining an estimated foreground color image generation process.

An estimated foreground color image generation process will now be explained with reference to a flowchart shown in FIG. 7.

In step S31, the differential image generation part 31 differentiates the α values of individual pixels in the alpha mask image A by using Sobel filtering, and supplies a differential image A' including differential values Δα to the nearest foreground pixel map generation part 32.

In step S32, the nearest foreground pixel map generation part 32 integrates differential values Δα for pixels on all the paths from each pixel in the undefined region in the defined value map image S to all the defined pixels in the foreground object image on the boundary of the defined region, in accordance with the differential image A'. Then, the nearest foreground pixel map generation part 32 searches for, for each pixel, the path having the smallest integrated value of the differential values Δα, as the shortest path to a defined pixel, and reads the pixel position of the defined pixel.

Figure 8:
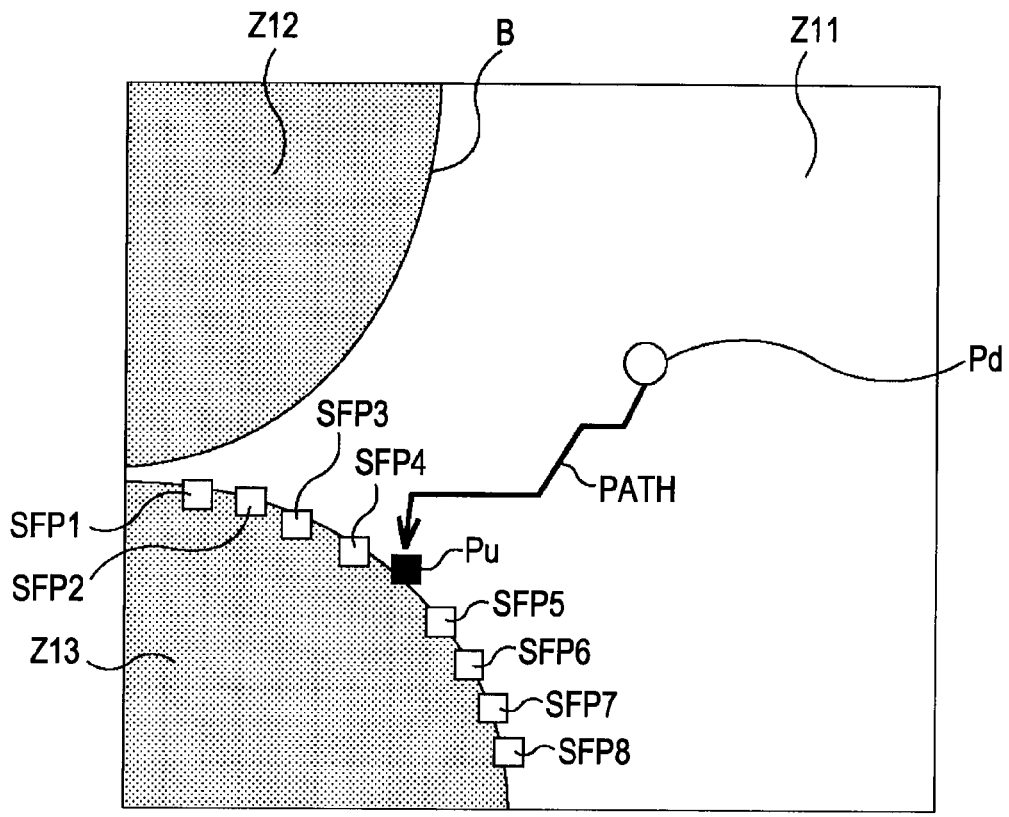
FIG. 8 is an illustration for explaining the shortest distance.

That is, as shown in FIG. 8, the nearest foreground pixel map generation part 32 integrates differential values Δα for pixels on all the paths PATH from a pixel Pd in the undefined region to a plurality of defined pixels Pu on the boundary, and searches for the defined pixel Pu having the smallest value in accordance with the calculation represented by equation (1):

$$d(p_d, p_u) = \min_{PATH_{pd,pu}} \int_0^1 |\Delta \alpha| \, dp \quad (1)$$

Figure 9:
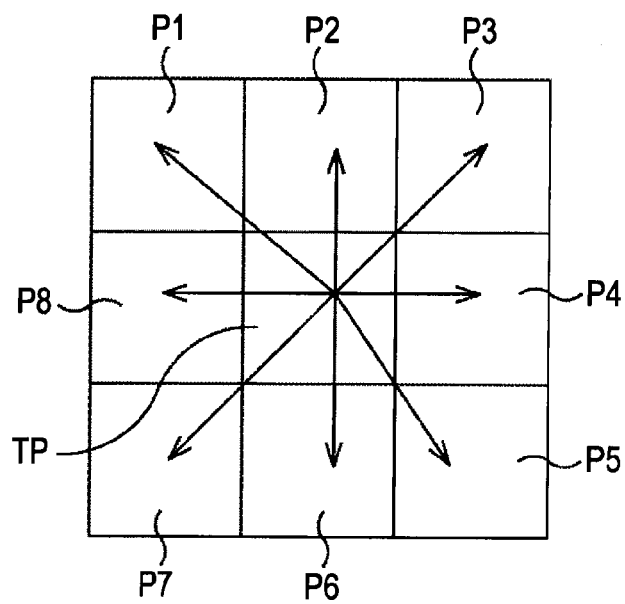
FIG. 9 is an illustration for explaining the relationship among eight neighboring pixels.

In equation (1), d(Pd, Pu) represents the defined pixel Pu that has the smallest one of the integrated values of the absolute values of the differential values Δα for all the pixels existing on all the paths PATH from the pixel Pd in the undefined region to defined pixels Pu existing on the boundary of the defined region. The distance defined as the integrated value of differential values Δα for each path is generally called geodesic distance. In addition, individual paths PATH are set by connecting a pixel to eight neighboring pixels as nodes, as shown in FIG. 9. That is, as shown in FIG. 9, neighboring pixels that can be set as the pixel next to a pixel TP on a path are pixels P1 to P8 in eight directions.

In FIG. 8, a region Z11 is an undefined region including undefined pixels, and regions Z12 and Z13 are defined regions including defined pixels of a foreground object image. In addition, a boundary B represents the boundary between the undefined region and the defined region, and white pixels SFP1 to SFP8 and the black pixel Pu are defined pixels on the boundary B.

Figure 10:
FIG. 10 is an illustration for explaining a distance map.

In addition, a distance map image M in which the distance (geodesic distance) from a pixel to the nearest defined pixel, which is obtained as the shortest distance, is set as a pixel value is, for example, as shown in FIG. 10. In the distance map image M shown in FIG. 10, black color is set for defined pixels. The brightness of the color is set in accordance with the distance. White color is set for the farthest pixel.

In step S33, the nearest foreground pixel map generation part 32 generates a nearest foreground pixel map image N, in which each undefined pixel is associated with information on the position of a pixel found as a pixel that can reach the undefined pixel through the shortest path, and supplies the nearest foreground pixel map image N to the estimated foreground color pixel generation part 33.

In step S34, the estimated foreground color pixel generation part 33 generates an estimated foreground color image F^ by reading the pixel value of a defined pixel in the input image I at a pixel position set for each undefined pixel in accordance with the nearest foreground pixel map image N and setting the read pixel value as the pixel value of the undefined pixel. That is, for example, as shown in FIG. 8, the estimated foreground color pixel generation part 33 sets the pixel value of the undefined pixel Pd to the pixel value in the input image I corresponding to the pixel position of the pixel Pu, which is the nearest foreground pixel found as a pixel that can reach the undefined pixel Pd through the shortest path.

In this case, a pixel selected as a pixel that can reach an undefined pixel through the shortest path set in the nearest foreground pixel map image N may be an inappropriate pixel. Thus, the estimated foreground color pixel generation part 33 may set, as the pixel value of an undefined pixel, the average of values obtained by applying predetermined weights to a plurality of defined pixels that are located near the pixel selected as a pixel that can reach the undefined pixel through the shortest distance and located on the boundary.

That is, as shown in FIG. 8, the average of the pixel values of the pixel Pu that is set as a pixel that can reach the undefined pixel Pd through the shortest distance and the defined pixels SFP1 to SFP8 that are located near the pixel Pu and located on the boundary may be calculated so that the average can be set as the pixel value of the undefined pixel Pd.

Furthermore, more detailed information on pixels near the pixel Pu will be available from, for example, "Jue Wang Cohen, M. F., "Optimized Color Sampling for Robust Matting", Computer Vision and Pattern Recognition, 2007.

By performing the process described above, an undefined pixel is replaced with a pixel in a foreground object image that can be reach the undefined pixel through the path for which the integrated value of differential values is smallest. Thus, a natural color in the foreground object image can be reproduced. Therefore, near the boundary between the foreground object image and the background image, color blur in the foreground object image caused by the background image can be reduced.

Figure 3:
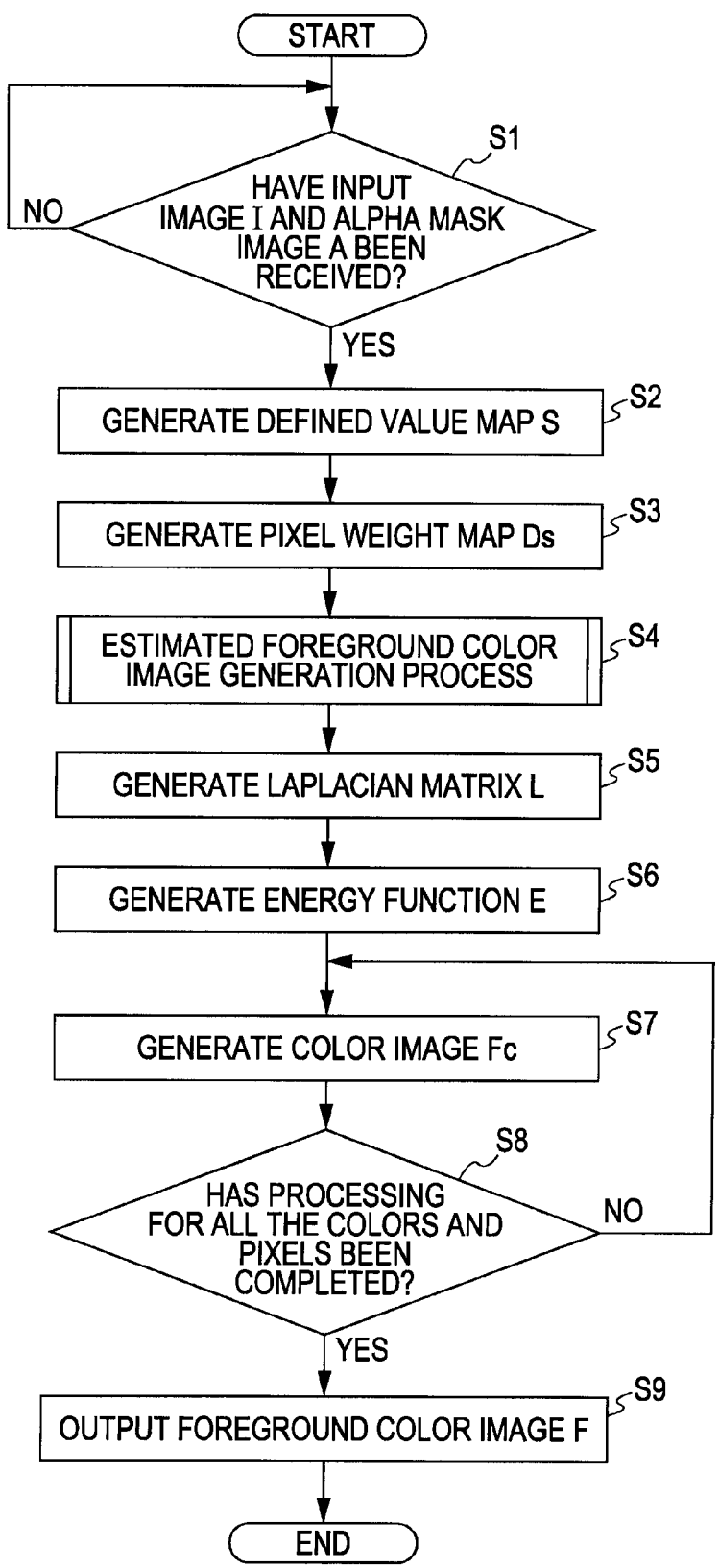
FIG. 3 is a flowchart for explaining a foreground image generation process.

Referring back to the flowchart shown in FIG. 3, in step S5, the Laplacian matrix generation unit 16 generates a Laplacian matrix L from the alpha mask image A, and supplies the generated Laplacian matrix L to the energy function generation unit 17. More specifically, the Laplacian matrix generation unit 16 generates a Laplacian matrix, which is a square matrix in which the number of rows and the number of columns are the same and the relationship among the pixels is expressed using a graph structure, for the total number of pixels (nodes)×the total number of pixels. More specifically, the Laplacian matrix generation unit 16 generates a Laplacian matrix L in which a diagonal element in each row is the same as the value obtained by inverting the sign of the total sum of off-diagonal elements in the row, that is, the total sum in each row is 0.

Figure 11:
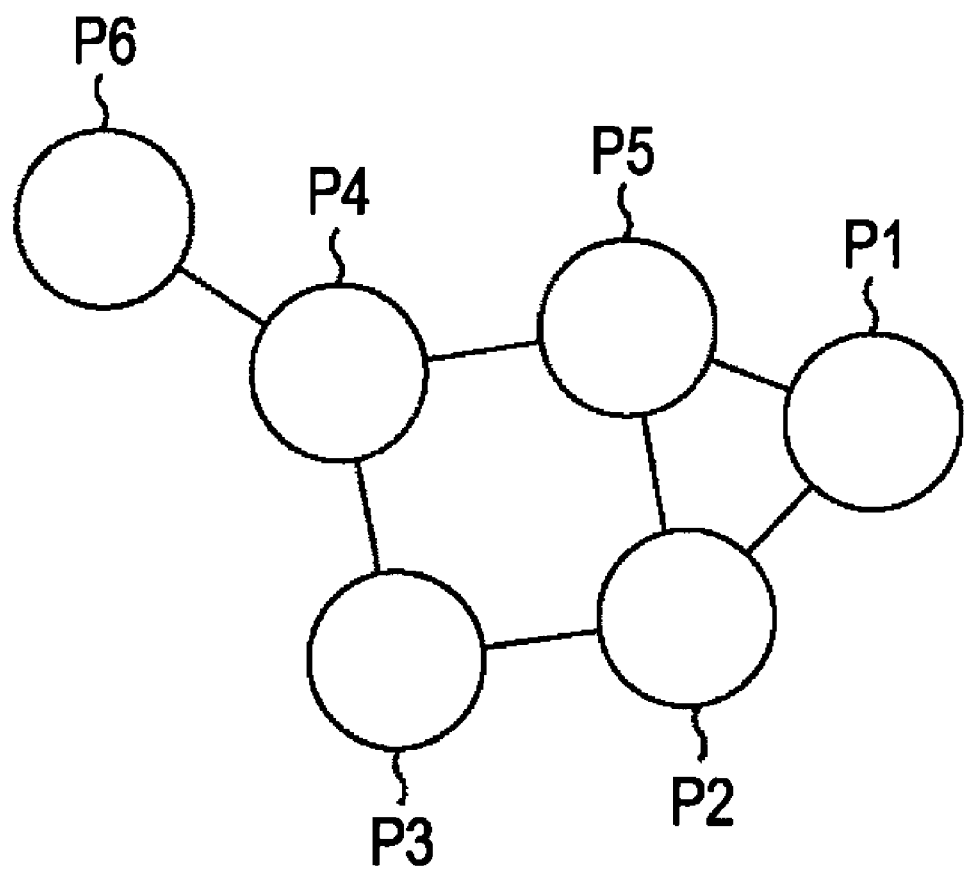
FIG. 11 is an illustration for explaining a graph structure.

For example, as shown in FIG. 11, the pixels P1 to P6 are connected and pixels connected through a line segment has a neighboring relationship. In the case of the relationship shown in FIG. 11, the Laplacian matrix generation unit 16 generates a Laplacian matrix L, for example, as shown in equation (2):

$$L = \begin{pmatrix} 2 & -1 & 0 & 0 & -1 & 0 \\ -1 & 3 & -1 & 0 & -1 & 0 \\ 0 & -1 & 2 & -1 & 0 & 0 \\ 0 & 0 & -1 & 3 & -1 & -1 \\ -1 & -1 & 0 & -1 & 3 & 0 \\ 0 & 0 & 0 & -1 & 0 & 1 \end{pmatrix} \quad (2)$$

That is, as shown in FIG. 11, the pixels P2 and P5 are connected to the pixel P1. Thus, the Laplacian matrix generation unit 16 sets, for the first row, "−1" in the second and fifth columns corresponding to the pixels P2 and P5 and "2" (=|−1|×2) in the first column, as shown in the Laplacian matrix L represented by equation (2).

Similarly, as shown in FIG. 11, the pixels P1, P3, and P5 are connected to the pixel P2. Thus, the Laplacian matrix generation unit 16 sets, for the second row, "−1" in the first, third, and fifth columns corresponding to the pixels P1, P3, and P5 and "3" (=|−1|×3) in the second column, as shown in the Laplacian matrix L represented by equation (2).

Furthermore, similarly, as shown in FIG. 11, the pixels P2 and P4 are connected to the pixel P3. Thus, the Laplacian matrix generation unit 16 sets, for the third row, "−1" in the second and fourth columns corresponding to the pixels P2 and P4, and "2" (=|−1|×2) in the third column, as shown in the Laplacian matrix L represented by equation (2).

Furthermore, similarly, as shown in FIG. 11, the pixels P3, P5, and P6 are connected to the pixel P4. Thus, the Laplacian matrix generation unit 16 sets, for the fourth row, "−1" in the third, fifth, and sixth columns corresponding to the pixels P3, P5, and P6, and "3" (=|−1|×3) in the fourth column, as shown in the Laplacian matrix L represented by equation (2).

Furthermore, similarly, as shown in FIG. 11, the pixels P1, P2, and P4 are connected to the pixel P5. Thus, the Laplacian matrix generation unit 16 sets, for the fifth row, "−1" in the first, second, and fourth columns corresponding to the pixels P1, P2, and P4, and "3" (=|−1|×3) in the fifth column, as shown in the Laplacian matrix L represented by equation (2).

Furthermore, similarly, as shown in FIG. 11, only the pixel P4 is connected to the pixel P6. Thus, the Laplacian matrix generation unit 16 sets, for the sixth row, "−1" in the fourth column corresponding to the pixel P4, and "1" (=|−1|×1) in the sixth column, as shown in the Laplacian matrix L represented by equation (2).

In step S6, the energy function generation unit 17 generates an energy function E in which the foreground color image F is used as a parameter, as represented by equation (3), in accordance with the pixel weight map image Ds, the Laplacian matrix L, and the estimated foreground color image $F\hat{\ }$, and supplies the generated energy function E to the foreground color image generation unit 18:

$$x=\arg\min(x^T L x + \lambda (x-F\hat{\ })^T Ds(x-F\hat{\ })) \quad (3)$$

In equation (3), "arg min(Q)" represents a mathematical symbol, which is a function for determining the value of a parameter x in such a manner that the minimum function Q can be obtained. In addition, "x" represents vectors for pixels in color images Fc forming a foreground color image F to be generated. Thus, in equation (3), a combination of vectors x for which the minimum energy function E can be obtained is obtained. In addition, "$x^T$" and "$(x-F\hat{\ })^T$" represent transpositions of vectors x and $(x-F\hat{\ })$, "L" represents a Laplacian matrix, "$\lambda$" represents a coefficient, which is a positive value, and "Ds" represents a pixel weight map image.

In equation (3), "$x^T L x$" represents a smoothing term, and "$\lambda(x-F\hat{\ })^T Ds(x-F\hat{\ })$" represents a data term.

A smoothing term operates to determine a vector x in such a manner that the values of neighboring pixels can be smoothed (the same). In addition, a data term operates to cause the vector x to approach an estimated foreground color image $F\hat{\ }$ by setting the vector x and the estimated foreground color image $F\hat{\ }$ to zero.

The smoothing term and the data term mutually have the trade-off relationship. When one of the smoothing term and the data term is preferentially set to zero (a minimum value), the other one of the smoothing term and the data term is set to be a greater value. Therefore, calculation of equation (3) is performed in such a manner that a good balance between the values of the smoothing term and the data term and the minimum sum can be obtained. In the actual calculation, the foreground color image generation unit 18 performs calculation of equation (3) by using a conjugate gradient method or LU decomposition to achieve minimization.

In addition, the coefficient $\lambda$ adjusts the relative strength of the data term with respect to the smoothing term. In addition, the pixel weigh map image Ds sets the relative level of importance of each row in the data term, that is, the degree of influence on the pixel values of pixels constituting a foreground object image. That is, if a term of 1.0 exists in the pixel weight map image Ds, the force of constraint increases by the coefficient $\lambda$ and the force of constraint decreases as the coefficient $\lambda$ decreases. When the force of constraint becomes zero in accordance with the pixel weight map image Ds or the coefficient $\lambda$, the level of importance of the data term becomes zero and thus the energy function E is determined only in accordance with the smoothing term. Note that although the pixel weight map image Ds includes a positive value, in general, within a range between 0.0 and 1.0, any value may be included in the pixel weight map image Ds.

In addition, the smoothing term and the data term are quadratic equations (multiplication of the vector x is performed twice) in order to mathematically obtain the minimum solution. For example, as represented by equation (4), the minimum value can be obtained by using a differential form:

$$(L+\lambda Ds)x=\lambda F\hat{\ } \quad (4)$$

In step S7, the foreground color image generation unit 18 obtains color images Fc constituting the foreground color image F by performing, for example, calculation of equation (4) to solve the vector x.

In step S8, the foreground color image generation unit 18 determines whether or not color images Fc for all the R (red), G (green), and B (blue) colors have been obtained. In a case where processing for all the colors has not been completed, the process returns to step S7 to perform processing for an unprocessed color. That is, processing of steps S7 and S8 is repeated until color images Fc for all the colors have been obtained.

Figure 12:
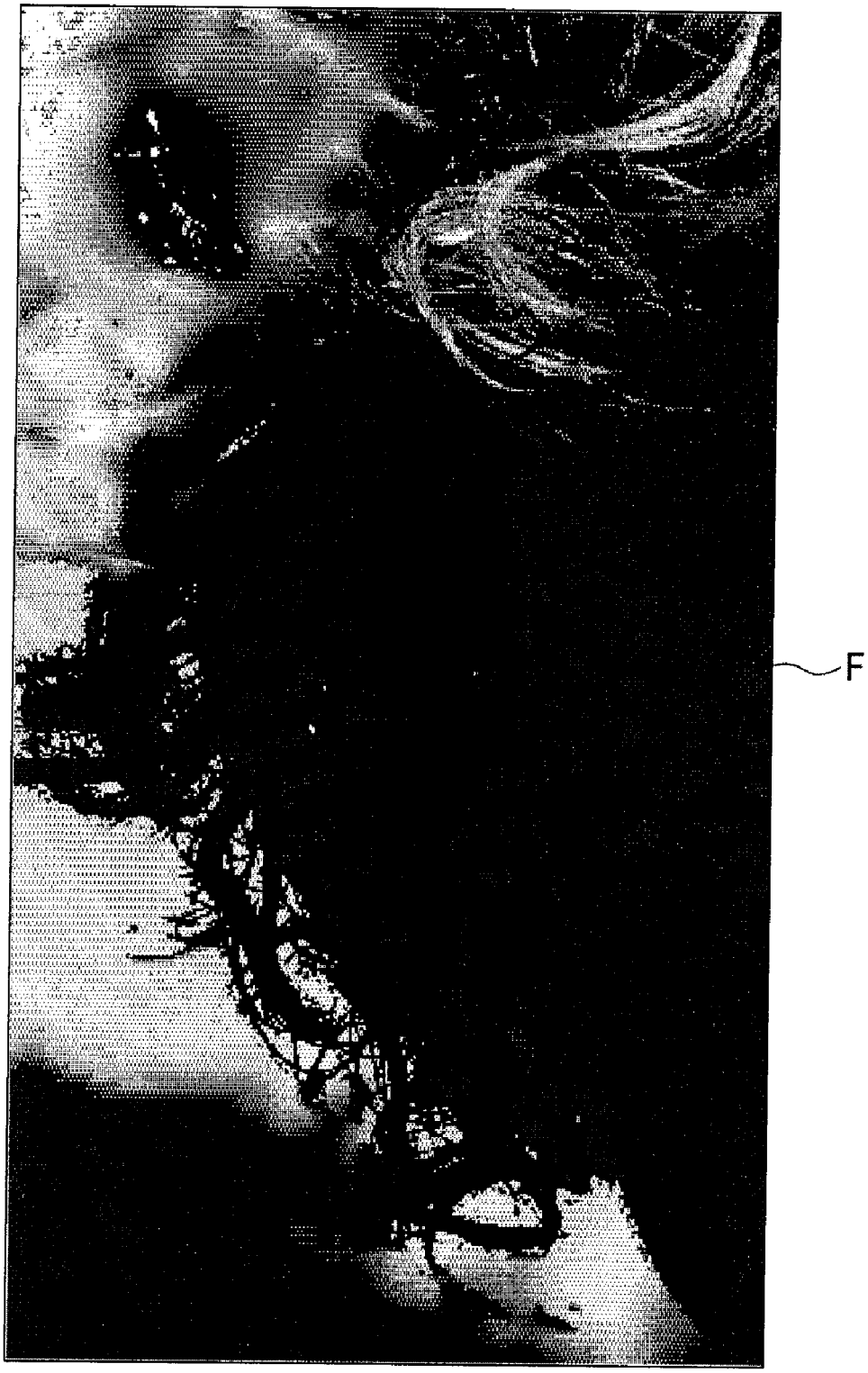
FIG. 12 is an illustration showing an example of a foreground color image.

In a case where it is determined in step S8 that color images Fc for all the colors have been obtained and the processing for all the colors has been completed, the foreground color image generation unit 18 forms the foreground color image F in accordance with the color images Fc for all the colors and outputs the foreground color image F as a foreground object image F, for example, as shown in FIG. 12, set on the basis of the alpha mask image A for the input image I.

By performing the process described above, vectors x formed by pixel values of a foreground color image corresponding to individual colors are obtained in such a manner that the minimum energy function E can be obtained, and a foreground color image F can be obtained from color images of individual colors formed by these vectors x. Accordingly, the foreground color image F is formed as a foreground object image F. As a result, blur caused by the color of a background image appearing near the boundary between a foreground object image and the background image in the foreground object image can be reduced.

The estimated foreground color image $F\hat{\ }$ obtained in the processing of step S4 may be provided as an input image. That is, as described in the document by Jue Wang Cohen, M. F., "Optimized Color Sampling for Robust Matting", Computer Vision and Pattern Recognition, 2007, the estimated foreground color image $F\hat{\ }$ is generated as a by-product when an alpha mask image is generated. By reusing the estimated foreground color image F^ in the processing of step S4 in an embodiment of the present invention, a higher processing speed and a reduction in the amount of necessary memory can be achieved.

In addition, regarding the estimated foreground color image F^ obtained in the processing of step S4, foreground likelihood values may be statistically obtained in accordance with a set of pixels of a foreground object image ($\alpha$=1) and a set of pixels of a background image ($\alpha$=0) and the shortest distance may be obtained by using a distance obtained by integrating the absolute values of the amounts of change in the foreground likelihood values starting from the set of pixels of the foreground object image.

Further more, regarding the estimated foreground color image F^ obtained in the processing of step S4, the shortest distance may be obtained by using a distance obtained by integrating the absolute values of the amounts of change in edge tangent flows (vectors) of an alpha mask image A starting from a set of foreground pixels. The edge tangent flow vectors can be obtained using the technique described, for example, in the document by H. Kang, S. Lee, C. Chui, "Coherent Line Drawing" Proc. ACM Symposium on Non-photorealistic Animation and Rendering, 2007. The amount of change w in edge tangent flow vectors can be calculated, for example, in accordance with the edge tangent flow vector $ti(x)$ of the current position x and the edge tangent flow vector $tj(x)$ of a neighboring position, as represented by equation (5):

$$w=1-|ti(x)\times tj(x)| \quad (5).$$

In addition, regarding the estimated foreground color image F^ obtained in the processing of step S4, the shortest distance may be obtained by using a distance obtained by integrating the amounts of change in the absolute values of edge tangent flows (vectors) of the input image I starting from a set of pixels of a foreground object image.

Furthermore, the Laplacian matrix L obtained in the processing of step S5 may be obtained in accordance with R, G, and B values of the input image I.

In addition, the Laplacian matrix L obtained in the processing of step S5 may be obtained by using foreground likelihood values statistically obtained in accordance with the set of foreground pixels and the set of background pixels in the input image. A foreground likelihood value is established by calculating a normalizing foreground likelihood value $Pb(x)$, for example, as represented by equation (6):

$$Pb(x)=p(C_x|\theta_{GF})/(p(C_x|\theta_{GF})+p(C_x|\theta_{GB})) \quad (6)$$

In equation (6), "x" represents a target pixel, "$p(C_x|\theta_{GF})$" represents a foreground likelihood value, "$p(C_x|\theta_{GB})$" represents a background likelihood value. The above-mentioned likelihood value "p( )" is calculated, for example, by using a Gaussian Mixture Model.

In a case where a user wants to prioritize the calculation time over the quality of the foreground color image F, calculation of the estimated foreground color image F^ may be omitted in the processing of step S4. In this case, pixel values of individual pixels in the estimated foreground color image F^ in a defined region are set to 0 and pixel values of pixels in a region other than the foreground object image region in a pixel weight map image Ds are set to 0. Accordingly, since a foreground color image is obtained under constraint of only the positions of foreground pixels, high-speed processing can be achieved.

In addition, in the processing of step S5, the definition of the energy function E is performed by extracting one of color components of the input image I as Fc. However, in a case where a user wants to prioritize the processing speed over a reduction in the amount of necessary memory, an energy function E including three colors at the same time may be defined.

As described above, according to an embodiment of the present invention, blur caused by the color of a background image appearing near the boundary between a foreground object image and the background image in the foreground object image can be reduced.

The series of processes described above may be performed by hardware or software. In a case where the series of processes are performed by software, a program constituting the software is installed from a recording medium into a computer built in dedicated hardware or, for example, a general-purpose personal computer that is capable of executing various functions on the basis of various programs being installed thereon.

Figure 13:
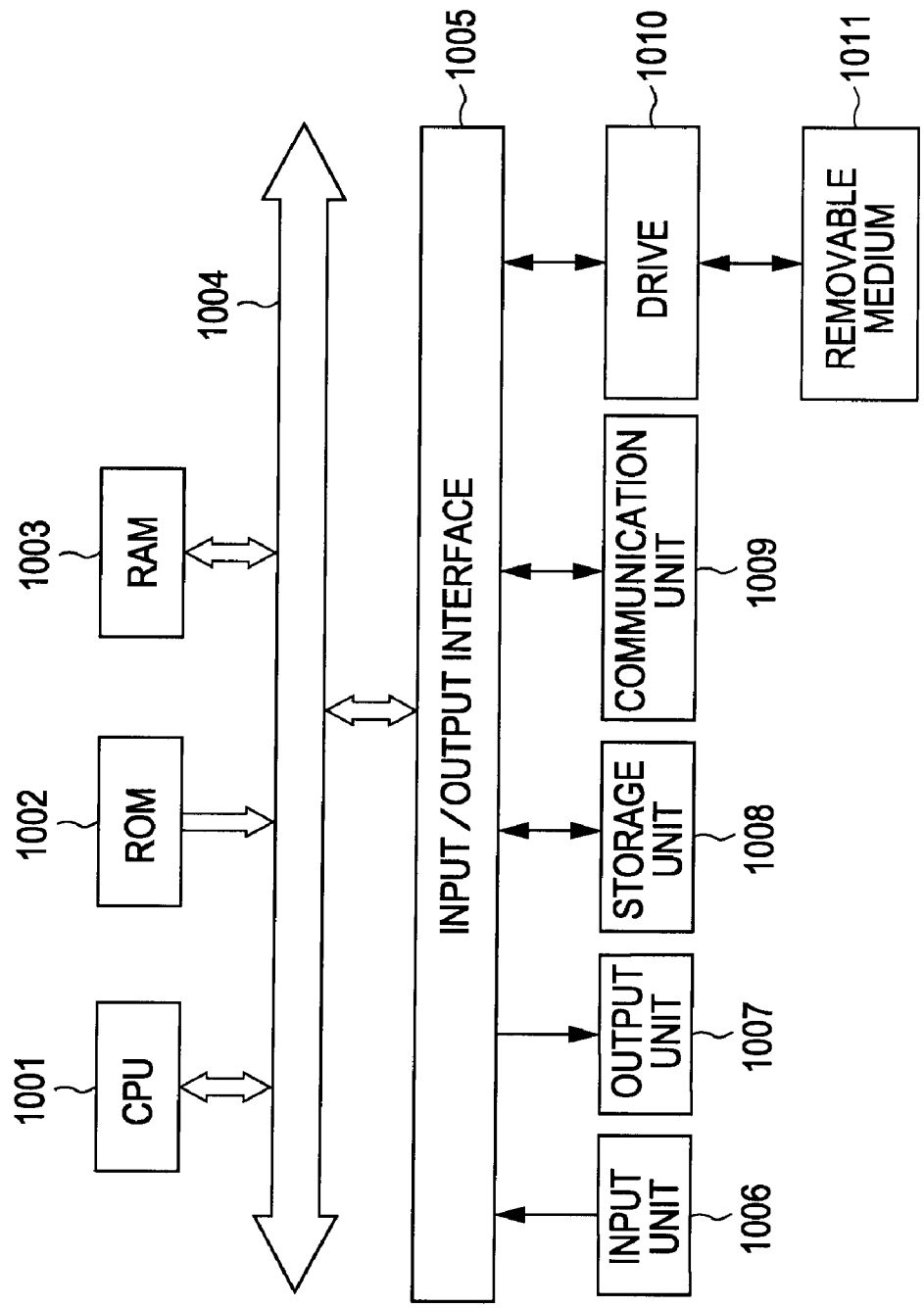
FIG. 13 is an illustration for explaining an example of the configuration of a personal computer.

FIG. 13 shows an example of the configuration of a general-purpose personal computer. The personal computer contains a central processing unit (CPU) 1001. An input/output interface 1005 is connected through a bus 1004 to the CPU 1001. A read-only memory (ROM) 1002 and a random-access memory (RAM) 1003 are connected to the bus 1004.

An input unit 1006 including input devices, such as a keyboard and a mouse, used by a user to enter an operation command, an output unit 1007 for outputting a processing operation screen and a processing result image to a display device, a storage unit 1008 including a hard disk drive in which a program and various data are stored, and a communication unit 1009 including a local-area network (LAN) adaptor and the like and performing communication processing via a network such as the Internet are connected to the input/output interface 1005. In addition, a drive 1010 for reading and writing data from and to a removable medium 1011 such as a magnetic disk (a flexible disk or the like), an optical disk (a compact disc read-only memory (CD-ROM), a digital versatile disc (DVD), or the like), a magneto-optical disk (Mini Disc (MD)), or a semiconductor memory is connected to the input/output interface 1005.

The CPU 1001 performs various processes in accordance with a program stored in the ROM 1002 or a program that is read from the removable medium 1011, such as a magnetic disk, an optical disk, a magneto-optical disk, or a semiconductor memory, installed into the storage unit 1008, and loaded from the storage unit 1008 to the RAM 1003. Data necessary when the CPU 1001 performs various processes is also stored in the RAM 1003 in an appropriate manner.

In the description, steps describing a program recorded in the recording medium include not only processing performed in a time-series manner in accordance with the written order but also processing performed in parallel or independently, the processing being not necessarily performed in a time-series manner.

The present application contains subject matter related to that disclosed in Japanese Priority Patent Application JP filed in the Japan Patent Office on Sep. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a defined binary image generating unit configured to generate a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value;

an estimated foreground color image generation unit configured to generate an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value;

a weighted-image generating unit configured to apply a weight to each of the individual pixels that are regarded as the undefined region pixels and that are set to have the predetermined third value in the defined binary image and generating a weighted image associated with the defined binary image;

a matrix generating unit configured to generate a Laplacian matrix in accordance with path information in which the individual pixels in the level image are expressed by a graph structure;

a function generating unit configured to generate an energy function employing a foreground color image as a parameter in accordance with the weighted image, the Laplacian matrix, and the estimated foreground color image; and a foreground color image calculating unit configured to calculate a foreground color image for which a minimum energy function is obtained.

2. The image processing apparatus according to claim 1, wherein the estimated foreground color image generating unit includes:

a differential processing unit configured to perform differential processing of the first value for the individual pixels in the level image; and a distance calculating unit configured to calculate, as the distances each obtained from the integrated value of the amounts of change in the continuity information, integrated values of differential processing results on the individual pixels in the level image obtained by the differential processing unit, the differential processing results regarding pixels on paths from the individual pixels in the level image to the pixels that are regarded as the defined region pixels and that are set to have the predetermined second value.

3. The image processing apparatus according to claim 1, wherein the estimated foreground color image generating unit generates the estimated foreground color image associated with the input image, by applying predetermined weights to pixel values of a plurality pixels in the input image that are located near the pixels in the input image corresponding to the pixels for which the distances each obtained from the integrated value of the amounts of change in the continuity information are shortest from among the pixels that are regarded as the defined region pixels and that are set to have the predetermined second value and located near the boundary between the undefined region and the defined region, obtaining averages of the pixel values that have been subjected to weighting, and setting the pixel values of the individual pixels that are regarded as the undefined region pixels and that are set to have the predetermined third value in the defined binary image to the averages.

4. The image processing apparatus according to claim 3, wherein the predetermined weights are set in accordance with distances from the pixels for which the distances each obtained from the integrated value of the amounts of change in the continuity information are shortest from among the pixels that are regarded as the defined region pixels and that are set to have the predetermined second value.

5. The image processing apparatus according to claim 1, wherein the distances each obtained from the integrated value of the amounts of change in the continuity information are represented by integrated values of the absolute values of the amounts of change in foreground likelihood values statistically obtained from positions of a set of pixels in the foreground image region and positions of a set of pixels in a background image region of individual pixels in the level image on paths from the individual pixels in the level image to the pixels that are regarded as the defined region pixels and that are set to have the predetermined second value.

6. The image processing apparatus according to claim 1, wherein the distances each obtained from the integrated value of the amounts of change in the continuity information are represented by integrated values of the absolute values of the amounts of change in edge tangent flow vectors of individual pixels in the level image on paths from the individual pixels in the level image to the pixels that are regarded as the defined region pixels and that are set to have the predetermined second value.

7. The image processing apparatus according to claim 1, wherein the distances each obtained from the integrated value of the amounts of change in the continuity information are represented by integrated values of the absolute values of the amounts of change in edge tangent flow vectors of individual pixels in the input image on paths from the individual pixels in the level image to the pixels that are regarded as the defined region pixels and that are set to have the predetermined second value.

8. The image processing apparatus according to claim 1, wherein the weight set for the weighted image controls the force of constraint for causing the estimated foreground color image in the energy function to approach the foreground color image.

9. The image processing apparatus according to claim 1, wherein the weight set for the weighted image is the first value set in the individual pixels in the level image.

10. An image processing method for an image processing apparatus including a defined binary image generating unit configured to generate a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and an estimated foreground color image generating unit configured to generate an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value, the method comprising the steps of:

generating, with the defined binary image generating unit, a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value;

generating, with the estimated foreground color image generating unit, an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value;

applying a weight to each of the individual pixels that are regarded as the undefined region pixels and that are set to have the predetermined third value in the defined binary image and generating a weighted image associated with the defined binary image;

generating a Laplacian matrix in accordance with path information in which the individual pixels in the level image are expressed by a graph structure;

generating an energy function employing a foreground color image as a parameter in accordance with the weighted image, the Laplacian matrix, and the estimated foreground color image; and calculating a foreground color image for which a minimum energy function is obtained.

11. A non-transitory, computer-readable storage medium storing a program for causing a computer controlling an image processing apparatus including a defined binary image generating unit configured to generate a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value; and an estimated foreground color image generating unit configured to generate an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value, to perform processing comprising the steps of:

generating, with the defined binary image generating unit, a defined binary image associated with a level image, which is associated with an input image, the level image having pixel values of individual pixels represented using a first value indicating the level of a pixel value in a foreground image region in the input image, the defined binary image being generated by regarding, in a case where the first value of a pixel in the level image is close to a maximum value or close to a minimum value, the pixel as a defined region pixel located in a defined region and setting the pixel to have a predetermined second value, and by regarding, in a case where the first value of a pixel in the level image is neither close to the maximum value nor the minimum value, the pixel as an undefined region pixel located in an undefined region and setting the pixel to have a predetermined third value;

generating, with the estimated foreground color image generating unit, an estimated foreground color image associated with the input image, in which the pixel values of the individual pixels that are regarded as the undefined region pixels and that are set to have the predetermined third value in the defined binary image are set to pixel values of pixels in the input image corresponding to pixels for which distances each obtained from an integrated value of the amounts of change in continuity information are shortest from among the pixels that are regarded as the defined region pixels and that are set to have the predetermined second value;

applying a weight to each of the individual pixels that are regarded as the undefined region pixels and that are set to have the predetermined third value in the defined binary image and generating a weighted image associated with the defined binary image;

generating a Laplacian matrix in accordance with path information in which the individual pixels in the level image are expressed by a graph structure;

generating an energy function employing a foreground color image as a parameter in accordance with the weighted image, the Laplacian matrix, and the estimated foreground color image; and calculating a foreground color image for which a minimum energy function is obtained.

* * * * *